Nov. 2, 1937.                H. McKAY                2,097,862
                              FIRE HOSE
                          Filed April 9, 1936
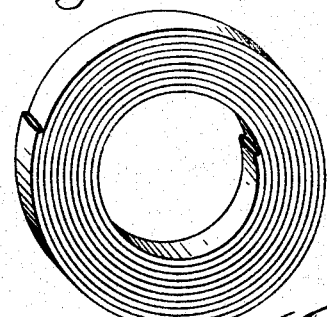
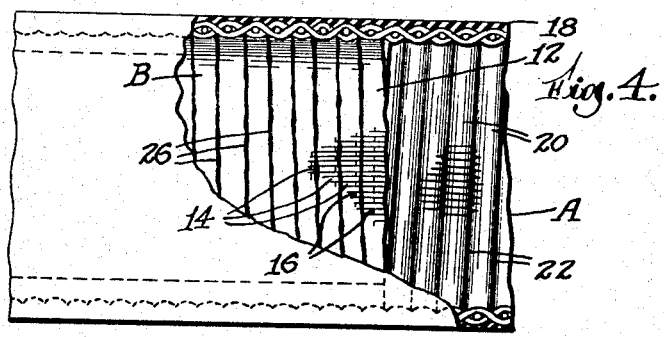
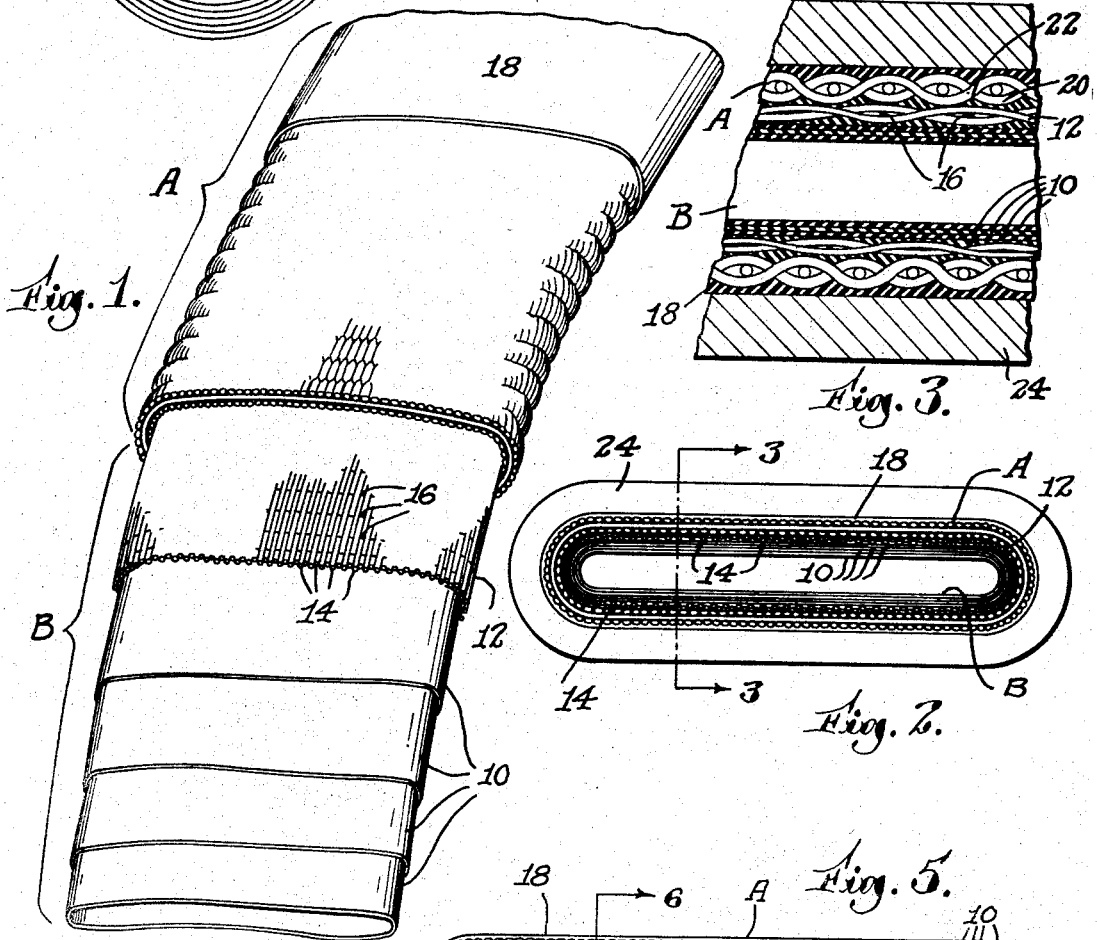
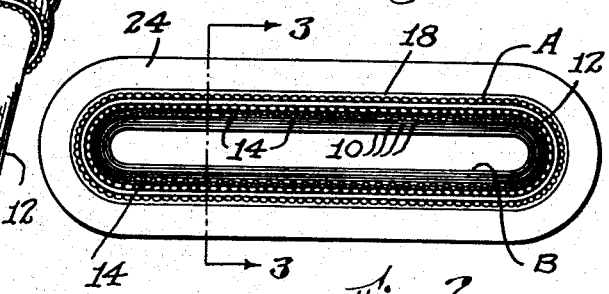
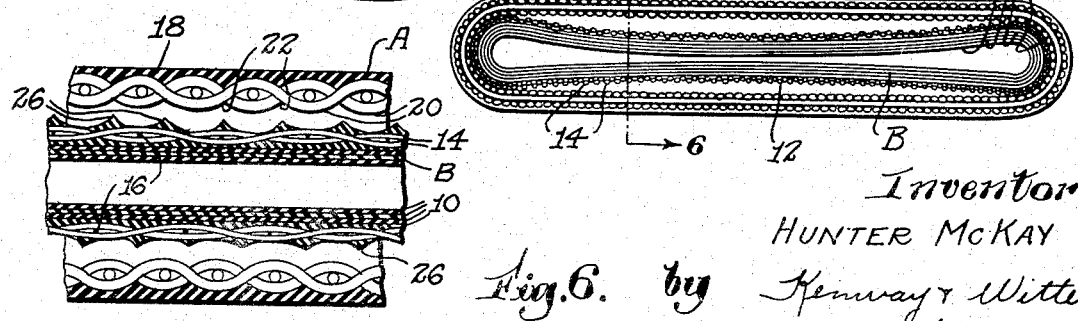
Inventor
HUNTER McKAY
by Kenway & Witter
Attorneys Patented Nov. 2, 1937

2,097,862

UNITED STATES PATENT OFFICE 2,097,862

FIRE HOSE

Hunter McKay, Cambridge, Mass., assignor to Boston Woven Hose and Rubber Company, Cambridge, Mass., a corporation of Massachusetts Application April 9, 1936, Serial No. 73,463

6 Claims. (Cl. 138—53)

This invention relates to fire and mill hose or any hose which it is desired at times to handle in a closely coiled and flat collapsed condition. Heretofore such hose commonly comprised an inner rubber tube disposed within and attached more or less completely to an outer jacket of cotton fabric. It is highly desirable that such hose should be as flexible and collapsible as possible when not in use and to this end it has feen heretofore proposed to attach the inner tube within the outer jacket only in limited areas, as for example, in one or more longitudinal bands or zones. Hose thus constructed has, however, been unsatisfactory particularly for the reason that water pressure within the hose may cause longitudinal pressure waves in the inner tube with the result that it is broken loose and blown out of the jacket. The primary object of my invention is to provide an improved and more flexible hose of this nature wherein these objections are eliminated and which may be rolled flatter and in more completely collapsed condition than hose heretofore known.

In one aspect my invention consists in an improved hose having a full-floating inner tube which, while expansible radially or circumferentially, is practically inextensible longitudinally, thus being capable of expanding sufficiently to fill the jacket without being subject to bunching or blowing out of the jacket. A suitable tube may be produced by combining with the rubber ply or plies thereof a textile fabric which is practically non-extensible longitudinally, but freely expansible transversely or circumferentially, this fabric preferably forming the outer surface of the tube and being located adjacent to the outer jacket of the hose when combined therewith. I have found that an inner tube which is unattached throughout its length to the outer jacket and has a fabric surface in contact with fabric of the outer jacket renders the hose extremely flexible and readily collapsible, partly because it permits easy slippage between the component parts of the hose when the latter is bent or collapsed. The jacket and the inner tube are permitted to shift with respect to each other in conforming to different conditions of curvature and the resulting hose may therefore be more easily handled in use and rolled into a smaller coil than heretofore.

A further feature of my invention consists in a novel construction providing a mechanical interlocking of the inner tube, when in expanded condition, with the outer jacket of the hose whereby further tending to prevent elongation of the tube. The tube preferably comprises a plurality of rubber plies vulcanized together and having a fabric applied to the outer surface and comprising relatively strong and inextensible warp threads which threads may be held together in the fabric by extensible weft threads, or threads so relatively weak as readily to break when the tube is expanded. In accordance with my invention, the outer jacket is provided with transversely extending ribs on its inner face and corresponding ribs adapted to interlock therewith are formed on the outer face of the tube during vulcanization thereof. The vulcanizing treatment is effected by placing the tube within the outer jacket, expanding the tube into contact with the jacket and vulcanizing the tube in such position by passing live steam under pressure into the tube, meanwhile holding the jacket in flat collapsed condition. Such treatment forces the outer surface of the tube into close conforming contact with the ribbed inner surface of the jacket and cures the tube while in such position. Thus the tube and the jacket are not only accurately formed with interlocking ribs but the entire hose is cured flat whereupon it thereafter normally assumes a flat collapsed condition which condition aids substantially in rolling the hose into a relatively small coil.

These and other features of the invention will be best understood and appreciated from the following description of a preferred embodiment thereof, selected for purposes of illustration and shown in the accompanying drawing, in which, Fig. 1 is a fragmentary view in perspective of my improved hose in process of manufacture, a portion thereof being broken away to show its construction.

Fig. 2 is an end elevation of the hose and a form which confines the hose during molding and vulcanizing treatment of the inner tube.

Fig. 3 is an enlarged fragmentary sectional view taken on the line 3—3 of Fig. 2.

Fig. 4 is a fragmentary view of the completed hose, portions being broken away to show its construction.

Fig. 5 is an end elevation of the completed hose.

Fig. 6 is an enlarged fragmentary sectional view taken on the line 6—6 of Fig. 5.

Fig. 7 illustrates a portion of the hose in coiled condition.

As herein illustrated, my improved hose comprises an outer tubular jacket A and an inner tube B loose within the jacket, the jacket and tube conforming to each other and normally assuming the flat collapsed condition illustrated.

The inner tube B is preferably made up of a plurality of plies 10 of rubber calendered into a single unit and a textile fabric ply 12 is united to the outer surface of this unit and forms the outer surface of the tube. As heretofore stated, it is desired that the tube as a whole shall be radially expansible so that it may fully fill the jacket when fluid pressure is admitted to the tube but that it shall be non-extensible longitudinally, and the fabric is so constructed and applied that it serves these functions. The fabric 12 comprises strong and relatively inextensible warp threads 14 extending longitudinally along the tube substantially parallel to its axis. These threads serve the sole purpose of the fabric in its relation to the tube, namely, reinforce the tube and prevent elongation thereof. However, for convenience in applying the threads 14 to the rubber plies 10, the threads are lightly held together by weft threads 16 which weft threads may be either of an extensible nature permitting of considerable expansion of the tube or they may be so relatively weak as to break when the tube is expanded by fluid pressure. In any event the fabric 12 is expansible with the plies 10 of the tube but it prevents elongation thereof.

It will be apparent that the multiple ply construction of the tube unit eliminates the possibility of a hole forming through any relatively weak portion of one of such plies and generally lends strength to the unit. In order to render this superior construction more apparent, I preferably form the alternate plies 10 of different colors, the laminated construction thereby being quickly observed at the cut edge or end of the tube. The tube is preferably constructed from flat material by first building up and calendering the rubber plies 10 into a unitary laminated sheet and then placing this sheet over a mandrel of the proper size and lapping and vulcanizing the ends together to form a tube. After the tube has been fully formed the fabric 12 is applied to the exterior thereof as by a layer of rubber cement.

The jacket A may comprise a single tube portion, as illustrated, or a plurality of such portions in telescopic relation. This jacket is of tubular woven cotton goods and is formed from warp and weft threads in the usual manner. It will be understood that this jacket part of the hose is flexible but practically non-extensible longitudinally and inexpansible circumferentially whereby to withstand the water pressure within and supporting the inner tube B. The outer surface of the jacket may be left uncovered or it may be covered with a suitable protective coating of rubber or the like as indicated at 18. The inner surface thereof has ribs 20 extending transversely therearound, these ribs being formed by the filler or weft thread and being continuous and parallel, a valley 22 being formed between each two adjacent ribs.

The hose normally assumes the flat collapsed condition illustrated, due to the curing treatment of the inner tube B which treatment will now be described. Assuming that the rubber plies 10 and fabric 12 of the inner tube have been formed into a unit B, this unit is placed within the jacket A. The combined units A and B are then placed within a form 24 having the inner cross sectional oblong contour which it is desired that the hose shall normally assume. Steam under pressure is then directed into the tube B whereby the tube is expanded into close contact with the rubber inner wall of the jacket A. The weft threads 16, which preferably comprise relatively weak and easily broken threads and whose sole function is to hold the fabric 12 together while it is being applied to the rubber plies 10, are readily broken by this expansion whereby permitting the tube freely to expand against the inner wall of the jacket.

The steam pressure within the tube is sufficient to press and hold the tube in firm contact with the ribbed inner wall of the jacket, and this pressure is maintained for sufficient time to complete the vulcanizing of the inner tube. During this time a portion of the rubber plies 10 is expressed through the fabric 12 and into the valleys 22 between the ribs 20, whereby forming interlocking ribs 26 on the exterior surface of the tube. As illustrated in Figs. 4 and 5, these ribs 26 normally fall away from the jacket when the hose is in collapsed condition but are adapted to interlock with the ribs of the jacket and thereby prevent elongation of the tube B whenever fluid pressure is applied to the interior of the tube.

It will now be apparent that I have produced a superior and normally flat collapsing fire hose which will roll into a smaller coil 28 than has been possible with such hose heretofore known. Furthermore, it will be apparent that since the ribbed interior of the jacket A forms the matrix against which the outer surface of the tube B is molded, these two surfaces will closely and immediately interlock whenever the hose is used. The interlocking of the ribs 20 and 26 and the threads or cords 14 both serve the purpose of preventing elongation of the tube B and it will be understood that the hose can embody one or both such features as appears most desirable.

Having thus described my invention, what I claim as new and desire to secure by Letters Patent of the United States is,

1. A fire hose comprising an outer textile jacket, and an inner tube freely and floatingly disposed therein and including in its structure a rubber ply having a textile ply united thereto and fabricated with relatively inextensible threads extending substantially parallel to the axis of the tube, said threads reinforcing the tube against elongation, and the textile ply being readily expansible with the rubber ply whereby fluid pressure within the tube is effective to expand the tube into close contact with the outer jacket.

2. The fire hose defined in claim 1 wherein said textile ply has therein weft thread cooperating with the first named threads and so relatively weak as readily to break when the tube is expanded by said fluid pressure.

3. A fire hose comprising an outer tubular jacket of textile fabric, and an inner tube freely and floatingly disposed therein and including in its structure a rubber tube made up of a plurality of distinct rubber plies joined in face to face contact by vulcanization and a readily expansible textile ply bonded by vulcanization to the outermost rubber ply and fabricated with relatively inextensible threads extending substantially parallel to the axis of the tube, the tube being readily expansible into close contact with the outer jacket but being prevented from elongation by said threads.

4. A fire hose comprising an outer tubular jacket having ribs extending transversely around the inner surface thereof, and an inner tube freely and floatingly disposed in the jacket, the inner tube being radially expansible into contact with the outer jacket and having ribs on its exterior surface for interlocking with said ribs of the jacket when expanded into contact therewith.

5. A fire hose comprising an outer textile jacket having parallel ribs extending transversely around the inner surface thereof, and an inner tube freely and floatingly disposed in the jacket, the inner tube being readily expansible into engagement with the outer jacket and having parallel ribs on its exterior surface corresponding to and adapted to interlock with said ribs of the jacket when expanded into engagement therewith.

6. A fire hose comprising an outer tubular jacket of textile fabric including in its structure a weft thread extending continuously and spirally therearound, the convolutions of said thread forming parallel ribs upon the inner surface of the jacket, and an inner tube freely and floatingly disposed in the jacket, the inner tube being readily expansible into engagement with the outer jacket and having parallel ribs on its exterior surface corresponding to and adapted to interlock with said ribs of the jacket when expanded into engagement therewith.

HUNTER McKAY.